July 10, 1956

S. SHAPIRO 2,754,072

AIRCRAFT LANDING GEAR

Filed Sept. 23, 1952

Sam Shapiro
  INVENTOR.

BY *James M. Clark*

HIS PATENT ATTORNEY.

July 10, 1956

S. SHAPIRO 2,754,072

AIRCRAFT LANDING GEAR

Filed Sept. 23, 1952

Sam Shapiro
INVENTOR.

BY *James W. Clark*

HIS PATENT ATTORNEY.

United States Patent Office 2,754,072
Patented July 10, 1956

2,754,072
AIRCRAFT LANDING GEAR

Sam Shapiro, Seattle, Wash., assignor to Boeing Airplane Company, a corporation of Delaware Application September 23, 1952, Serial No. 310,952

12 Claims. (Cl. 244—102)

The present invention relates to landing gears for aircraft and more particularly to improved landing gear components which are shortened upon retraction to facilitate their storage within the aircraft.

In the retraction of landing gears for aircraft it is frequently a considerable problem to obtain sufficient space within a nacelle, wing, or other portion of the aircraft and a number of landing gears have been constructed and used in which the struts have been folded or "broken," or compacted and shortened in various ways to facilitate the stowage of the retracted gear. The present invention is directed to an improved shock-absorbing strut which is automatically compacted and shortened as the strut is retracted and its shortening is assisted by the energy which is normally stored within the strut. This has been accomplished in the present improved shock-absorbing strut by providing a movable head or diaphragm component within the outer cylinder member of the strut. The movable head member is preferably pivotally engaged by a linkage which automatically causes shifting of the head member and simultaneous telescoping of the piston or inner cylinder portion during retraction, and opposite shifting of the head member and extension of the piston portion during extension of the landing gear.

It is accordingly a principal object of the present invention to provide an improved landing gear of the retractable type which may be appreciably compacted or shortened to facilitate stowage within the aircraft. It is a further object to provide an improved oleo type shock-absorbing strut which is capable of being telescoped to a shorter length as it is retracted and conversely to be extended to its normal operative length upon extension of the landing gear. It is a further object of the present invention to provide an improved shock-absorbing strut comprising two normally telescoping components and a third component normally fixed to one of the first two components but automatically movable with respect thereto upon retraction at which time it contracts by withdrawing the third component with it into a compact arrangement which materially facilitates retraction and stowage of the strut. Further objects reside in the improved relationship of the shock-absorbing strut and its associated linkages as well as in its utilization of the energy which is normally stored in the compressed shock absorbing fluid of the strut to assist in its shortening operation.

Other objects and advantages of the present invention will occur to those skilled in the art after reading the present description taken in conjunction with the accompanying drawings, forming a part hereof, in which.

Figure 2:
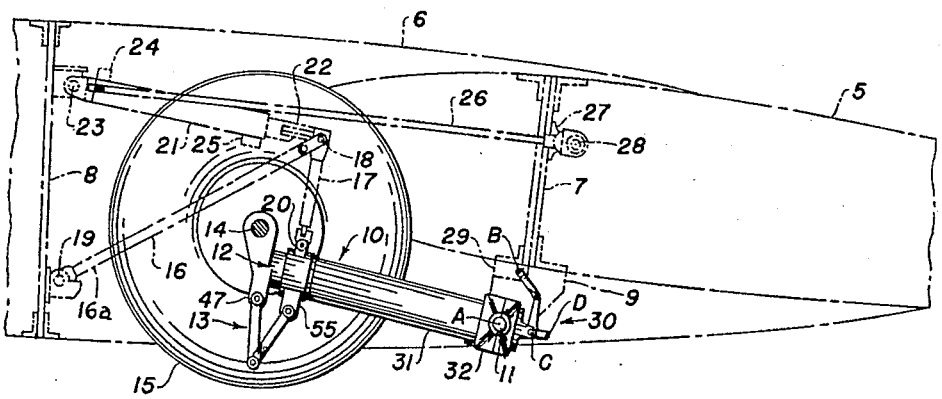
Fig. 2 is a similar view of the same with the landing gear shown in its retracted position.
Figure 1:
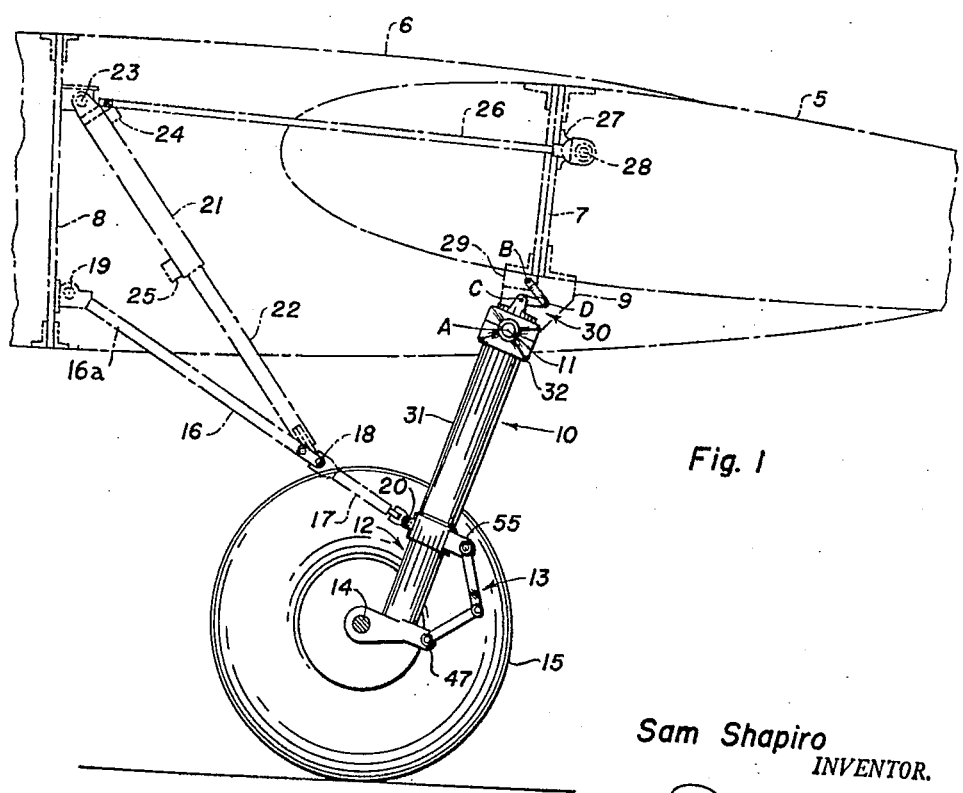
Fig. 1 is a side elevational view of a form of the improved strut shown in conjunction with a landing gear in its fully extended operative position.

Referring now to Figs. 1 and 2, the numeral 5 represents the leading portion of an aircraft wing from which is supported an engine nacelle 6 extending forward of the wing leading edge. The wing 5 is provided with a transversely extending span-wise spar 7 and the nacelle 6 is provided with a transverse bulkhead or firewall 8 which is preferably disposed aft of the engine compartment. A pair of spaced fittings 9 are preferably attached to the lower chord of the spar 7 for the pivotal support of the improved oleo shock-absorbing strut 10 upon the pivot 11. Inasmuch as the present improvement principally resides in the shock-absorbing strut 10, its pivotal mounting 11, and the associated linkage 30 (which will be more fully described below), the environment of the wing 5 and nacelle 6, as well as the associated landing gear struts, have been shown for illustrative purposes only. It will accordingly be understood that the improved strut 10 is equally capable of use in other environments, as well as with landing gear struts of entirely different arrangement and construction than those which have been illustrated.

The oleo shock-absorbing strut 10 comprises essentially an outer cylinder member 31 which is pivotally supported by the pivot 11; and within this outer cylinder member there is arranged to reciprocate, or telescope, the lower inner cylinder member or wheel-carrying piston member 12. The latter is articulated to the main cylinder portion by the torque scissors or torsion linkage assembly 13 and the lower terminal of the inner cylinder 12 is provided with an axle fitting 14 upon which the landing wheel 15 is rotatably mounted.

A "breaking" strut and frame composed of the strut portions 16 and 17, intermediately pivoted at 18, connects to the pivot fittings 19 adjacent the lower edge of the firewall 8 and at its aft portion by the pivot 20 to the lower portion of the main shock-absorber outer cylinder 31. The strut frame 16 may be of a conventional type arranged with its laterally spaced base terminals 16a pivoted to the fittings 19 to provide lateral bracing of the gear. The actuating means for the extension and retraction of the landing gear comprises an electric motor driven extensible lead screw actuator 21 having an extensible portion 22 pivotally connected to the intermediate pivot 18 between the break strut portions 16 and 17. The retracting screw is preferably a hollow tube threaded to match a retracting nut and may be of a conventional type. The opposite terminal of the actuating strut 21—22 is pivotally connected at 23 to the firewall 8 of the nacelle and at opposite ends of the actuating unit 21 there are preferably provided conventional means illustrated at 24 and 25 for shutting off the motor at the limits of the landing gear movements. In the event of failure of the power system, or of the electric motor, there is preferably provided an emergency manual actuating rod 26 operatively engaging the lead screw actuating mechanism and suitably supported in the fitting 27 upon the spar 7. This manual cranking mechanism is operatively connected, as by suitable gearing, to the spawnwise extending actuating shaft 28 extending to the cockpit or other space convenient to an operator.

Other than the shortening of the improved strut 10 (which will be described below in greater detail) the retraction and extension of the landing gear assembly illustrated at Figs. 1 and 2 is considered to be apparent and self-explanatory. It will be obvious that as the retraction motor is energized, in the extended position of the gear shown in Fig. 1, the extensor portion 22 is withdrawn within the housing of the main portion 21 causing upward and forward pull upon the pivot 18 thereby "breaking" the landing gear struts 16 and 17 which rotate in opposite directions about their respective pivots 19 and 20. This contraction of the actuator unit 21—22 causes substantially vertical movement of the pivot 18 to the retracted position shown in Fig. 2 in which the shock-absorbing unit 10 is rotated forwardly and upwardly in the clockwise direction about its pivotal mounting 11 to a position somewhat beyond the horizontal and from which it is suspended from the break strut 17 which assumes a substantially vertical position. It will be noted that in Fig. 2, the inner cylinder 12 is substantially fully telescoped within the main outer cylinder portion 31 of the strut 10, having been retracted therewithin as a result of the linkage 30, pivoted to the aircraft structure at 29, shown at the opposite end of the strut, in a manner which will be more fully described below and whereby the landing gear and its wheel 15 is permitted to be retracted into a space within which it might not otherwise be stowable.

Figures 3, 4, 5:
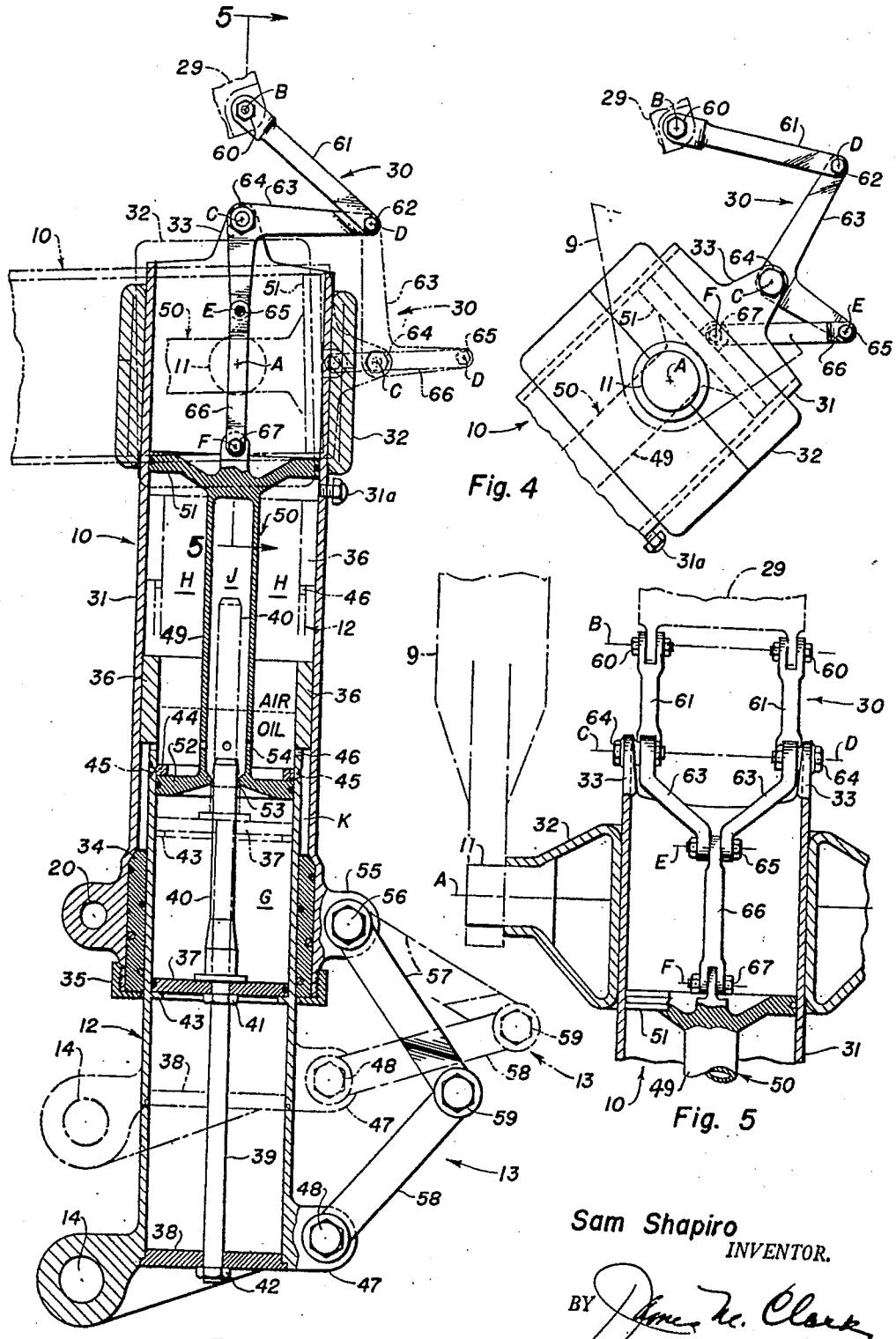
Fig. 3 is a detailed sectional view of the improved shock-absorbing strut showing its internal construction and associated linkage.
Fig. 4 is a view of the head portion of the strut and its associated linkage shown in a partially retracted position of the strut.
Fig. 5 is a cross-sectional view of the head portion of the strut as taken along the lines 5—5 of Fig. 3.

Referring now to Figs. 3 to 5, inclusive, the improved oleo shock-absorbing strut 10 is comprised of three main components, namely, the main outer cylinder portion 31, the piston portion or inner cylinder 12 and the shiftable diaphragm or head portion 50, between each of which under certain conditions relative movement takes place. Of these three components the outer cylinder portion 31 is relatively fixed, i. e., in its operative extended and unloaded position shown in Fig. 3, it is fixedly supported upon the aircraft structure and the piston portion 12 reciprocates therewithin in a resiliently opposed fashion upon an air cushion as it is compressed by a metered oil flow as landing impacts and other loads are absorbed by the wheel 15 and the shock absorber. The construction lines in Fig. 3, indicate the position of the piston portion 12 under impact or load. The shiftable diaphragm or third component 50 is shown in its fixed operative position in Fig. 3 and, upon rotation of the strut 10 to its retracted position, this shiftable head component 50 is withdrawn upwardly to the upper end of the cylinder portion 31, it being shown in Fig. 4 in a partially retracted position.

The outer cylinder portion comprises essentially the cylinder or casing 31 having a trunnion yoke 32 fixed to its upper or head portion and in turn is secured to the trunnion pivots 11 which are suitably journalled within the support fitting 9 attached to the lower chord of the spar 7 as shown in Fig. 2, this comprising the main pivotal axis A. The wall of the casing 31 extends upwardly to form two opposed lugs or bifurcations 33 which are suitably apertured for a pair of bell-crank members 63 mounted upon the pivot bolts 64 on an aligned axis C. The opposite end of the casing 31 is enlarged adjacent the pivotal lug portion 20 to internally receive the annular seal ring 34 and its extreme lower end is threaded to receive the end cap or closure 35 which, in bearing against the lower end of the ring 34, serves to fixedly mount the ring within the enlarged portion at the lower end of the casing.

The piston or inner cylinder component 12 is comprised essentially of a tubular barrel portion which is enlarged at its upper end to form the hollow piston head 36 which is telescopically slidable within the bore of the casing 31. This piston head 36 provides the area for the oil pressure to act upon and guides the inner cylinder within the outer cylinder. An annular stop ring or shoulder 43 is formed within the inner cylinder 12 against which the transversely disposed wall plate or disc 37 is drawn together with the end closure plate 38 by the tie-rod 39 supporting at its upper end the orifice rod or metering pin 40. The tie-rod 39 is secured to the plate 37 by the nut 41 and the end closure 38 is retained within its rabbeted seat by the nut 42 engaging the threaded lower terminal of the tie-rod 39. It will accordingly be seen that the rods 39 and 40, as well as the closure plates 37 and 38, are fixedly secured in position within the inner cylinder 12 and move therewith as a unit. A further annular stop-ring 44 is secured to the tubular wall of the inner cylinder 12 just below its enlarged hollow piston head portion 36, being secured to the internal bore of the inner cylinder by the countersunk head rivets or screws 45. Between the stop ring 44 and the enlarged head portion 36 of the inner cylinder, there is a series of apertures 46 which serve to provide communication of the fluid between the upper chamber H and the annular chamber K disposed between the walls of the inner and outer cylinder members, this chamber K being defined in the axial direction by the enlarged piston head portion 36 and the annular seal ring 34. The lower orificed diaphragm 52 of member 50 cooperates with the stop ring 44 of the inner cylinder 12 to provide an interengaging means permitting telescoping but preventing separation of the members 12 and 50.

In the relationship of the inner cylinder member 12 to the outer cylinder casing 31 as shown in the full line position in Fig. 3, the strut is not carrying any load, or is unloaded, and the inner cylinder member 12 is shown in its broken line position as it would be when subjected to a relatively heavy landing impact in which the metering pin 40 is forced upwardly within the tubular portion of the shiftable head member 50 and the head of the piston portion 36 closely approaches the diaphragm or head of the member 50. The lower end of the inner cylinder 12 has formed thereon, in addition to the wheel axle fitting 14, the apertured lugs 47 which receive the pivot bolt 48 of the nutcracker linkage 13.

The third or piston head component 50 is composed of the diaphragm head 51, which sealingly engages the bore of the outer cylinder 31, and the lower orificed piston portion 52 sealingly reciprocable within the inner bore of the inner cylinder 12, the diaphragm head or piston portions 51 and 52 being integrally interconnected by the tubular portion defining the chamber J. The piston or diaphragm portion 52 is provided with a contoured metering aperture or central orifice 53 which cooperates with the metering pin 40 to closely confine and meter the flow therethrough and closely spaced about the opening 53 the wall of the tube 49 is provided with a series of apertures 54 which provide communication between the outer annular chamber H and the inner chamber J. The intermediate member 50 accordingly is in effect a double piston element, a chamber-forming element, or a double diaphragm element, the upper diaphragm 51 defining the top of chambers H and J and the lower orificed diaphragm defining the top of chamber G.

It will, accordingly, be noted that three main chambers or spaces G, H and J and one supplemental chamber K are defined by the relatively moving parts of the three (3) components of the strut 10. The chamber G is formed within the inner cylinder 12 between its fixed transverse plate 37 and the piston portion 52 of the retractable double-ended head member 50. This chamber G contains the orifice rod or pin 40, and is normally completely filled with oil or hydraulic fluid. The strut is filled and replenished with air and oil through the filler connection 31a through the wall of the cylinder 31 and above the piston 36. Within the outer cylinder casing 31 and externally of the tubular portion 49 of the retractable head member 50, the chamber H is formed and is defined at its ends by the retractable head or diaphragm 51 and the piston portion 52. This chamber H is normally partly filled with oil as indicated by the oil level line near the bottom of the chamber and its upper portion is filled with air under pressure, the chamber H being in communication with the chamber J through the orifices 54, and with chamber K through the orifices 46. The internal chamber J is in communication with the lower chamber G through the central orifice 53 around the pin 40, and is also in communication with the chamber H through the orifices 54. The above described chamber K is in communication only with the chamber H through the orifices 46.

The lower hub portion of the casing 31 has integrally formed thereon the lugs 55 suitably apertured for the pivot pin 56 which cooperates with the corresponding pin 48 on the inner cylinder to pivot the links 57 and 58, which in turn are intermediately pivoted by the pivot bolt 59 to form the nut-cracker linkage 13. The latter provides anti-torque means to prevent relative rotation between the relatively fixed outer cylinder 31 and the inner cylinder or piston 12 as it telescopes within the outer cylinder thereby maintaining the landing wheel 15 in the proper direction under all load conditions.

The cylinder head retracting mechanism, as indicated above, is comprised of the linkage assembly 30, and consists of the two bell-cranks 63, and the links 61 and 66 to which they are pivotally connected. The links 61 are each pivotally connected by the pivot bolt 60 on the aligned axes B to the linkage pivot fitting 29, and in turn are pivotally connected by the pivot pins 62 on the axis D to the upper arm of the bell-crank member 63, both ends of the links 61 preferably being bifurcated. The linkage pivot fitting 29 is attached to the lower chord of the spar 7 and is disposed between the two larger fittings 9 which provide the support for the main strut pivots 11, one of the fittings 9 being shown in Fig. 3, adjacent the intermediate linkage fitting 29. As described above, the mid-portions of the bell-cranks 63 are each pivotally bolted at 64 upon the upwardly extending lug or ear portions 33 of the outer cylinder casing 31 on the axis C of the pivot bolts 64. The lower arms of the bell-crank members 63 are pivotally connected to each side of the upper terminal of the link 66 by the pivot bolt 65 on the axis E, and the lower end of the link 66 is pivotally connected to the head portion 51 by the pivot bolt 67 on the axis F.

In the arrangement of the linkage 30 as shown in Fig. 3, it will be noted that in the extended position of the strut 10, the axes A, B, C, E and F are all aligned, i. e., they lie within the same plane, and only axis D is offset therefrom. Accordingly any impact tending to telescope the piston or inner cylinder 12 within the outer cylinder casing 31 results in upward movement of the inner cylinder 12 into chamber H in which the air and oil becomes compressed, and the metering pin 40 moves upwardly into the inner chamber J similarly compressing the air and oil therein. Upward movement of the head portion 51 due to this increase in the air pressure beneath its lower surface is however opposed by the alignment of the axes C, E and F, the force being taken up by compression in the aligned link 66 and the lower arms of the bell-cranks 63. The shiftable head member 50, in addition to opposing the telescoping of the outer cylinder 31 and the inner cylinder 12, and absorbing the compression of the fluid below its head portion 51, also limits the downward extension of the inner cylinder 12 by the stop ring 44. The latter is fixed to the inner cylinder 12, bearing against the upper face of the piston portion 52 of the head member 50, when the landing wheel is suspended in its unloaded condition as shown in Fig. 3, and to which position the cylinder elements 12 and 31 are extended by the energy stored in the compressed fluid.

When the landing gear strut, as shown in Fig. 3, is subjected to an impact in landing or taxiing, the inner cylinder 12 is forced upwardly and is telescoped within the outer cylinder 31 and about the inner orificed piston portion 52, and simultaneously the pin 40 is forced upwardly into the chamber J. The fluid within the lower chamber G is accordingly compressed and forced upwardly around the pin 40 and through the orifice 53 into the chamber J. Due also to the upward movement of the rod 40 into the chamber J simultaneously as the piston portion 36 moves upwardly into chamber H, the air at the top of chambers J and H is compressed and the fluid is forced from the chamber J through the apertures 54 into the lower portion of the chamber H and thence outwardly through the apertures 46 into the expanding chamber K, until the load is absorbed and dissipated by the compression of the air within the upper portion of the strut. As the inner cylinder 12 is again extended under the influence of the highly compressed air at the top of the strut after the impact load has been absorbed, the flow moves in the opposite direction, namely, from chamber K into chamber H, and from chambers H and J back into chamber G.

Upon retraction of the landing gear from the extended operative position shown in Fig. 1, by the contraction of the actuating strut 21—22, the shock-absorbing strut 10 is rotated in the clockwise direction about its pivotal mounting 11 upon the main axis A. The axis C, upon which the bell-crank 63 is pivoted is similarly caused to rotate in the clockwise direction about the axis A, and moves out of alignment with the plane passing through the axes A, B and C of the extended position. Referring now to Figs. 3 and 4, it will be noted that as the strut is rotated into the partially retracted position of Fig. 4, and the pivot C has moved to the right of the line connecting the axes A and B, the link 61, attached to the upper arms of the bell-cranks 63 has caused the latter to rotate in the counterclockwise direction about the axis C, or the pivot bolts 64. This counterclockwise rotation of the pivot 65, causes the link 66 to be moved outwardly and the head portion 51 of the member 50 to be drawn upwardly and outwardly to the construction line position shown in Fig. 3 closely adjacent the open upper end of the cylinder 31. As the member 50 is caused to move upwardly within the cylinder 31, its inner piston portion 52 engages the stop ring 44 fixed to the inner cylinder 12 and accordingly the latter cylinder 12 is also drawn upwardly within the outer cylinder 31 to follow the upwardly lifted member 50. As this occurs, the only change in internal volume of the strut 10 is within the chamber K between the inner cylinder 12 and the outer cylinder 31. Work is accordingly extracted from chamber K as the air and oil expand and once the alignment is broken between the link 66 and the lower arms of the bell-cranks 63, this expansion of the air and oil assists in the retraction of the strut 10 and its associated linkages 16, 17 and 21.

In the case of the installation shown in Figs. 1 and 2, wherein the particular landing gear was designed for retracting upwardly and forwardly towards the nose of the airplane, this available energy materially helps to counteract the forces of gravity and the air drag or resistance, both of which tend to extend the landing gear and oppose its retraction. In extending the landing gear the reversal of the foregoing described action takes place with the gravitational force and the force of the airstream assisting the power exerted within the actuating strut 21 in overcoming the tendency of the air and oil to cause the head member 51 to remain near the end of the cylinder 31 to thereby effect extension of the landing gear. During extension of the landing gear therefore the air and oil is recompressed by the toggle action of the pivots 65 being forced into alignment between the pivots 64 and 67. It will accordingly be noted that the linkage 30 at the top of the strut allows the entire chamber H to be moved upward towards the retraction axis A and to thereby shorten the effective overall length of the strut 10, inasmuch as the inner cylinder is drawn up a like distance at the same time. It will also be obvious that by increasing the proportions of the volumes of the chambers, or the ratio of the inside diameter of the outer cylinder 31 with respect to the outside diameter of the inner cylinder 12, the air pressure exerted against the undersurface of the upper diaphragm head 51 tends to cause the strut to retract more readily and thereby decreases the retraction power requirements of the actuating strut 21.

Other forms and modifications of the foregoing invention, both with respect to its general arrangement and the details of its respective parts, are intended to come within the scope and spirit of this invention as more particularly set forth in the appended claims.

I claim:

1. In an aircraft, a supporting structure, a retractable shock-absorbing strut comprising an outer cylinder member pivotally mounted upon said supporting structure adjacent a first end of said cylinder member, an inner cylinder member having an open end reciprocably mounted for sliding telescopic movement within the opposite end of said outer cylinder member, said inner cylinder member having a transverse wall axially spaced from the open end thereof, a cylinder head member having a first end slidingly engaging said outer cylinder member adjacent the pivotally mounted end thereof and normally fixed with respect thereto, said normally fixed cylinder head member having its opposite end slidably engaging said inner cylinder member, a main fluid chamber defined by said outer and inner cylinder members and said cylinder head member arranged to absorb landing shocks imparting telescopic compaction of said shock-absorbing strut, a supplemental fluid chamber formed between said inner and outer cylinder members in fluid communication with said main fluid chamber, said supplemental fluid chamber adapted to have its volume increased upon telescopic compaction of said shock-absorbing strut, compressed fluid disposed within each said chamber, power means operatively connected to said outer cylinder member adapted to rotate said outer cylinder member about said pivotal mounting upon said supporting structure for retraction of said shock-absorbing strut, and linkage means including a bell-crank lever pivotally mounted upon said outer cylinder member and operatively connected to said normally fixed cylinder head member at a first terminal, said bell-crank lever operatively connected to said supporting structure at a second terminal, said linkage means arranged upon retractive rotation of said outer cylinder member to axially shift said normally fixed cylinder head member toward said first end of said outer cylinder member for the shortening of said shock-absorbing strut as said outer cylinder is retractably rotated about said pivotal connection to the supporting structure, the shifting of said normally fixed cylinder head member being assisted by the expansion of the compressed shock-absorbing fluid within said supplemental chamber.

2. In an aircraft, an aircraft structure, a fluid shock-absorbing strut for said aircraft structure comprising a first cylinder pivotally mounted upon said aircraft structure, a second cylinder telescopically slidable within said first cylinder, said cylinder telescopically contracted when subjected to landing shocks, an axially shiftable head element normally fixedly disposed within said first cylinder in a fluid-tight relationship therewith, said second cylinder defining with said first cylinder and said head element a main fluid-tight chamber for the fluid absorption of landing shocks, compressed fluid disposed within said chamber, abutment means cooperatively carried by said second cylinder and said head element arranged to limit axial separation of said second cylinder with respect to said normally fixed head element and said first cylinder, actuating means operatively connected to said first cylinder for retracting said shock-absorbing strut about said pivotal mounting, and linkage means operatively interconnecting said first cylinder member with said head element and with the aircraft structure arranged upon retraction of said shock-absorbing strut by said actuating means about said pivotal mounting to axially shift said normally fixed head element and said second cylinder by said abutment means into a telescopically contracted position within said first cylinder in which the length of said shock-absorbing strut is materially shortened and its storage within said aircraft structure is facilitated.

3. In an aircraft, an aircraft structure, a fluid shock-absorbing strut for said aircraft structure comprising a first cylinder pivotally mounted upon said aircraft structure, a second cylinder telescopically slidable within said first cylinder, said cylinders telescopically contracted when subjected to landing shocks, an axially shiftable head element normally fixedly disposed within said first cylinder in a fluid-tight relationship therewith, said second cylinder defining with said first cylinder and said head element a main fluid-tight chamber for the fluid absorption of landing shocks, said first cylinder defining with said second cylinder a supplemental chamber in fluid communication with said main fluid chamber, compressed fluid disposed within said chambers, said chambers arranged such that telescoping of said cylinders under landing impacts results in further compression of the fluid in said main chamber and expansion of the volume of said supplemental chamber, abutment means cooperatively carried by said second cylinder and said head element arranged to limit axial separation of said second cylinder with respect to said manually fixed head element and said first cylinder, actuating means operatively connected to said first cylinder for retracting said shock-absorbing strut about said pivotal mounting, and linkage means operatively interconnecting said first cylinder member with said normally fixed head element and with the aircraft structure arranged upon retraction of said shock-absorbing strut by said actuating means about said pivotal mounting to axially shift said head element and said second cylinder by said abutment means assisted by the expansion of the fluid in said supplemental chamber into a telescopically contracted position within said first cylinder in which the length of said shock-absorbing strut is materially shortened and its storage within the aircraft structure is facilitated.

4. In an aircraft, an aircraft landing gear, a shock-absorbing strut for said landing gear comprising a main outer cylinder, means associated with said outer cylinder pivotally mounting said outer cylinder upon the aircraft, an inner cylinder internally slidable in a fluid-tight relationship within said outer cylinder, a double-ended piston member having a first terminal slidably mounted within said outer cylinder, said piston member normally fixed to said outer cylinder, said double-ended piston member having a second orificed terminal slidably mounted within said inner cylinder, shock-absorbing fluid chambers formed within said inner and outer cylinders by the first and second terminals of said double-ended piston member, a further fluid chamber formed between said inner and outer cylinders in fluid communication with said shock-absorbing fluid chambers, compressed fluid disposed within said chambers, means operatively connected to said strut for rotating said strut about said pivotal mounting for its retraction and extension, and linkage means pivotally mounted upon the aircraft and operatively connected to said outer cylinder and to said double-ended piston member for normally fixing said piston member to said outer cylinder in the extended operative position of said strut, said linkage means arranged to shift said double-ended piston member, said inner cylinder and said first fluid shock-absorbing chambers for their contraction within said outer cylinder during retraction of said shock-absorbing strut about said pivotal mounting upon the aircraft assisted by the expansion of the fluid in said further fluid chamber.

5. A retractable strut for an aircraft structure comprising a main cylinder supported on the aircraft structure containing shock-absorber fluid under pressure, a head element shiftably disposed within said main cylinder opposing escape of said fluid from the top end thereof, an inner cylinder slidably disposed within said main cylinder opposing escape of said fluid from the bottom end thereof, a main fluid chamber defined by said main cylinder, said head element and said inner cylinder adapted to have its volume reduced on telescopic contraction of said cylinders under load, a secondary fluid chamber of annular shape in fluid communication with said main chamber, said secondary fluid chamber defined by the telescoped walls of said cylinders and by thickened wall portions at the lower end of said main cylinder and the upper end of said inner cylinder, said second fluid chamber adapted to have its volume increased at a lesser rate than the decrease in volume of said main chamber upon telescopic contraction of said cylinders under load, linkage means pivotally connected to said main cylinder, to said head element and to the aircraft structure for retaining said head element in the elongated operative position of said strut, retraction means to rotate said main cylinder about said support on said aircraft structure to a retracted position of said strut; said rotation initiating movement of said linkage means from its retaining position permitting strut shortening concurrent shifting movements of said head element and said wheel-carrying inner cylinder under the influence of the expansion of the volume of fluid within said secondary fluid chamber representing the only change in internal volume of said strut, the resulting force exerted on said linkage means augmenting the force of said retraction means in the retraction of said strut.

6. A retractable strut of the type called for by claim 5 characterized by said head element having a detent portion disposed within said inner cylinder and an abutment portion on said inner cylinder adapted to engage said head element detent portion to limit the separation of said head element and said inner cylinder when said strut is not subjected to load.

7. A retactable strut of the type called for by claim 5 characterized by said head element having an orificed metering portion dividing said main fluid chamber into upper and lower portions and a metering pin carried by said inner cylinder reciprocably movable through said orificed metering portion upon telescopic contraction of said cylinders under load for metering the transfer of said fluid from said lower to said upper portion of said main fluid chamber.

8. In an automatically self-shortening retractable strut, an outer cylinder having a bore and open ends, an inner cylinder reciprocably closing a first of said outer cylinder ends, a shiftable head element reciprocably closing the second of said outer cylinder ends and cooperatively engaging said inner cylinder, said cylinders and head element defining a main chamber subject to volume reduction upon strut loading and a supplemental chamber subject to volume increase upon strut loading, fluid under pressure disposed within said chambers, means for retaining said head element in an operative position within said outer cylinder, retracting means for moving said strut into a retracted position whereby retracting movement of said strut initiates release of said head element for its reciprocal movement together with said inner cylinder through said cooperative engagement toward the second end of said outer cylinder under the influence of the fluid expanding within said supplemental chamber for the automatic shortening of said strut.

9. In a shock-absorbing landing gear for aircraft, an aircraft structure, an outer cylinder pivotally mounted upon said aircraft structure, an inner cylinder reciprocably mounted for telescopic movement within said outer cylinder, compressed fluid disposed within said outer and inner cylinders tending to telescopically separate the same in the axial direction, a shiftable member reciprocably mounted for axial movement in a fluid-tight relationship within said inner and outer cylinders, said inner and said outer cylinders defining with said shiftable member a main compressed fluid chamber opposing telescopic contraction of said cylinders, linkage means operatively connecting said shiftable member with said aircraft structure, a supplemental fluid chamber of annular shape formed between the walls and between axially spaced enlarged diameter portions of said inner and said outer cylinders, said supplemental chamber arranged to expand upon telescopic contraction of said inner cylinder within said outer cylinder, said supplemental chamber disposed adjacent to and in fluid communication with said main chamber, interengaging means including a stop element carried by said inner cylinder for engagement with said shiftable member for limiting said relative axial telescoping and preventing separation of said inner cylinder and said shiftable member in the axial direction opposite to said telescopic contraction, and power means operatively connecting said aircraft structure with said outer cylinder for rotating said outer cylinder about its pivotal mounting upon said aircraft structure for retracting said landing gear, said linkage means arranged such that rotation of said outer cylinder initiates simultaneous contraction of said shiftable member and engagement of said shiftable member with said stop element of said inner cylinder for relative axial contraction of said shiftable member and said inner cylinder assisted by the expansion of the compressed fluid within said expanding supplemental chamber.

10. In an aircraft, a landing gear including a shock-absorbing strut comprising a main outer cylinder, said outer cylinder having an upper portion and a lower portion, pivot means adjacent the upper portion of said outer cylinder pivotally mounting said outer cylinder upon the aircraft, an inner cylinder having an open end internally slidable within the lower portion of said outer cylinder, a piston member having an upper piston portion slidably mounted within the upper portion of said outer cylinder, said piston member having a lower orificed piston portion slidably mounted within the open end of said inner cylinder, fluid chambers formed within said inner and outer cylinders by the upper piston portion and the lower orificed piston portion of said piston member for opposing telescopic contraction of said inner and outer cylinders, said fluid chambers divided by, but in fluid communication with, each other through said lower orificed piston portion, compressed fluid disposed within said fluid chambers, a further supplemental chamber of annular shape formed between the walls of said inner and outer cylinders and defined by axially spaced enlarged diameter portions of said inner and outer cylinders, said supplemental chamber in fluid communication with said divided chambers and arranged such that the volume of said supplemental chamber is caused to expand upon telescopic contraction of said strut, retraction means carried upon the aircraft operatively connected to said outer cylinder for its retraction about said pivotal mounting, and linkage means operatively connected to said outer cylinder and to said piston member arranged to shift said piston member and said inner cylinder for telescoping within said outer cylinder during retraction of said strut about said pivotal mounting assisted by the expansion of the fluid in said supplemental chamber.

11. In an aircraft, a shock-absorbing strut for an aircraft landing gear comprising a main outer cylinder, said outer cylinder having upper and lower portions, trunnion means adjacent an upper portion of said outer cylinder pivotally mounting said cylinder upon the aircraft, an inner cylinder having an open end internally slidable in a fluid-tight relationship through the lower portion of said outer cylinder, said inner cylinder having its opposite end closed, a chamber-forming member having an upper portion slidably mounted in a fluid-tight relationship within the upper portion of said outer cylinder, said chamber-forming member normally fixed with respect to said outer cylinder and having a lower orificed portion slidably mounted in a fluid-tight relationship within said inner cylinder, fluid chambers formed within said inner and said outer cylinders by the upper and lower portions of said chamber-forming member and the closed end of said inner cylinder, compressed fluid disposed within each of said fluid chambers opposing inward telescoping of said inner cylinder within said outer cylinder under shock-absorbing loads tending to compress said strut, a further chamber of annular shape formed beween the telescoped ends of said inner and said outer cylinders and the walls thereof, said further annular chamber containing compressed fluid in communication with the other said chambers, the said walls and telescoped ends of said cylinders arranged such that the volume of said further fluid chamber is caused to expand upon inward telescoping of said inner and said outer cylinders and to thereby assist the telescoping of said inner cylinder within said outer cylinder, and pivoted linkage means including a bell-crank operatively connected to said main outer cylinder and to said chamber-forming member arranged to axially shift said chamber-forming member and said inner cylinder in an inward telescoping direction within said outer cylinder toward the upper portion thereof during retraction of said srut about said pivotal trunnion mounting assisted by the expanding fluid in said further annular chamber.

12. In an aircraft, a supporting structure, a retractable landing gear operatively associated with said supporting structure, an outer cylinder pivotally mounted at an upper portion upon said supporting structure, an inner cylinder having an open end reciprocably mounted for axial sliding movement in a fluid-tight relationship within the lower portion of said outer cylinder, a normally fixed member having axially spaced end portions, a first of said member end portions reciprocably mounted for axial sliding movement in a fluid-tight relationship within said outer cylinder adjacent the upper portion thereof, a second of said member end portions reciprocably mounted for axial sliding movement within the upper portion of said inner cylinder, said inner cylinder having a transverse wall disposed intermediate the upper and lower portions thereof, inter-engaging means including a projecting element carried by the upper portion of said inner cylinder engageable with said second end portion of said member permitting relative compacting movement in the same direction but restricting the extent of separating movement of said inner cylinder and said normally fixed member in the opposite directions, a plurality of shock-absorbing fluid chambers formed within and between said inner and outer cylinders and between said inner cylinder and said member, compressed fluid disposed within each of said fluid chambers, the volume of one of said chambers formed between said inner and outer cylinders arranged to increase and expand upon telescopic contraction of said cylinders, linkage means operatively connected to said supporting structure and to said member, and retraction means for rotating said outer cylinder about said pivotal mounting and concurrently drawing said member and said inner cylinder toward said upper portion of said outer cylinder through the medium of said linkage means and said inter-engaging means, respectively, assisted by the expansion of the fluid within the said chamber for which the volume increases upon telescopic contraction of said cylinders, the volume of the remaining fluid chambers remaining constant as said member and said inner cylinder are drawn concurrently upwardly and shifted axially within said outer cylinder toward the upper portion thereof.

References Cited in the file of this patent

UNITED STATES PATENTS

| | | |
|---|---|---|
| 1,918,426 | Radnor | July 18, 1933 |
| 2,005,980 | Minshall | June 25, 1935 |
| 2,092,662 | Weymouth | Sept. 7, 1937 |
| 2,186,266 | Onions | Jan. 9, 1940 |
| 2,319,446 | Dowty | May 18, 1943 |
| 2,390,661 | Parilla | Dec. 11, 1945 |
| 2,554,581 | Levy | May 29, 1951 |
| 2,563,518 | Dickerman | Aug. 7, 1951 |
| 2,621,004 | Ashton | Dec. 9, 1952 |

FOREIGN PATENTS

| | | |
|---|---|---|
| 580,038 | Great Britain | Aug. 23, 1946 |
| 996,613 | France | Sept. 5, 1951 |